United States Patent [19]

Kikuchi

[11] Patent Number: 5,461,445
[45] Date of Patent: Oct. 24, 1995

[54] APPARATUS FOR ATTACHING AND DETACHING ACCESSORY OF LENS

[75] Inventor: Katsumori Kikuchi, Tokyo, Japan

[73] Assignee: Asahi Kogaku Kogyo Kabushiki Kaisha, Tokyo, Japan

[21] Appl. No.: 396,051

[22] Filed: Feb. 28, 1995

Related U.S. Application Data

[63] Continuation of Ser. No. 172,384, Dec. 23, 1993, abandoned.

[30] Foreign Application Priority Data

Dec. 24, 1992 [JP] Japan ..................... 4-088440

[51] Int. Cl.⁶ ................................... G03B 11/04
[52] U.S. Cl. ........................... 354/287; 359/611
[58] Field of Search ................... 354/286, 287, 354/295; 359/611, 612, 819, 827, 828, 829

[56] References Cited

U.S. PATENT DOCUMENTS

| | | | |
|---|---|---|---|
| 3,758,198 | 9/1973 | Kanie et al. | 359/828 |
| 4,017,878 | 4/1977 | Hagiwara | 354/286 |
| 4,357,089 | 11/1982 | Okura et al. | 354/286 |
| 4,408,499 | 10/1983 | Haneishi | 74/527 |
| 4,420,239 | 12/1983 | Yasuyuki et al. | 354/286 |
| 4,860,043 | 8/1989 | Kurei et al. | 354/286 |
| 4,939,532 | 7/1990 | Takebayashi | 354/286 |
| 5,097,280 | 3/1992 | Nomura | 354/286 |
| 5,117,311 | 5/1992 | Nomura | 359/819 |
| 5,227,825 | 7/1993 | Eguchi et al. | 354/287 |
| 5,274,413 | 12/1993 | Nomura et al. | 354/286 |

FOREIGN PATENT DOCUMENTS 54-8097  4/1979  Japan .

Primary Examiner—Howard B. Blankenship
Attorney, Agent, or Firm—Sandler, Greenblum & Bernstein

[57] ABSTRACT

An apparatus for detachably attaching an accessory to a lens barrel, wherein the front end of the lens barrel and the accessory are provided with engaging members which are engaged and disengaged only when a predetermined angular relationship between the lens barrel and the accessory is met. The accessory is provided with at least one roller which is rotatably supported by a shaft extending parallel to an optical axis of the lens barrel. At least one abutting surface is provided on the front end of the lens barrel, and comes into contact with the roller or rollers of the accessory during rotation of the accessory while in contact with the lens barrel.

27 Claims, 14 Drawing Sheets

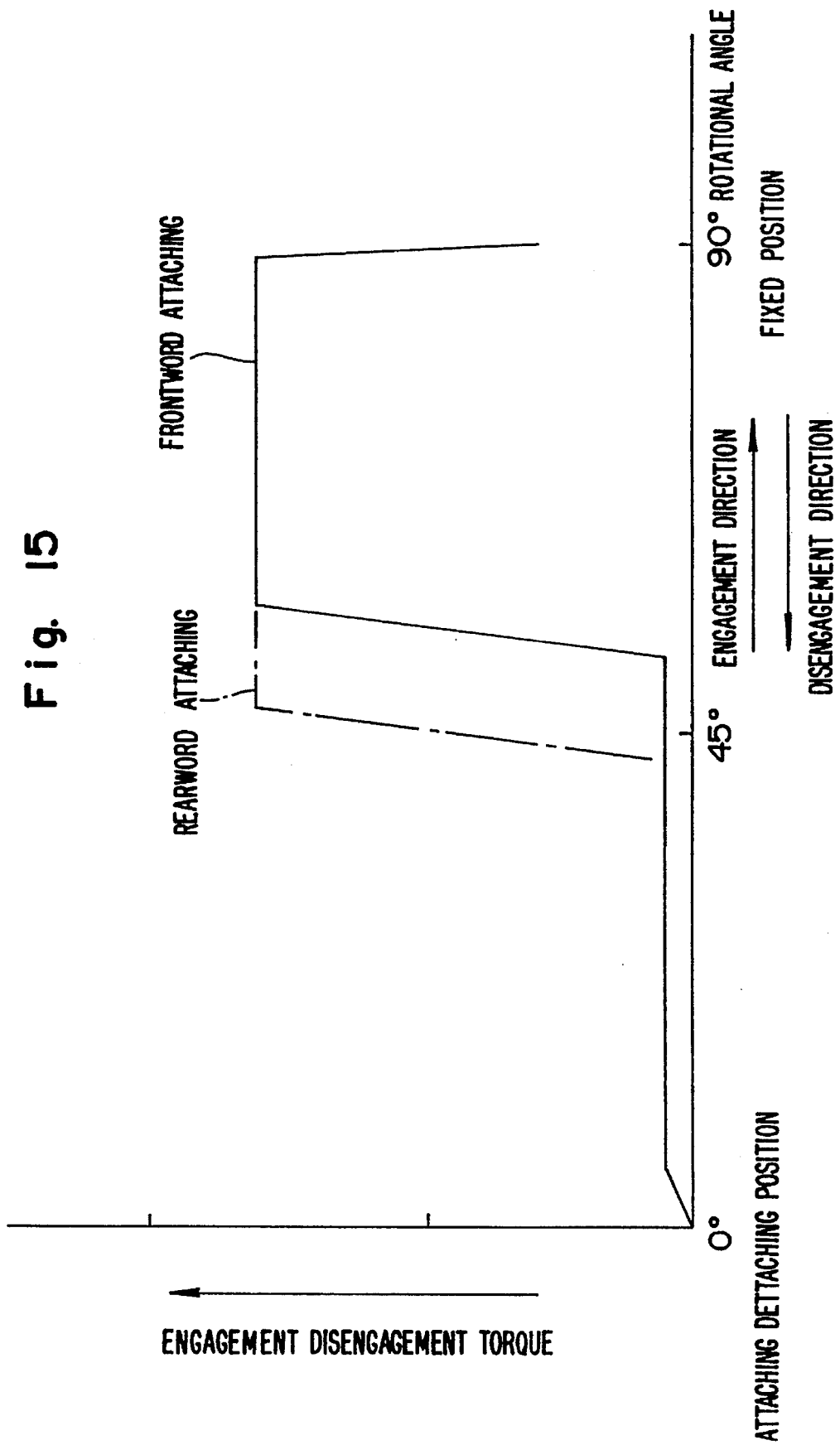

APPARATUS FOR ATTACHING AND DETACHING ACCESSORY OF LENS

This application is a continuation of application Ser. No. 08/172,384, filed Dec. 23, 1993, now abandoned.

BACKGROUND OF THE INVENTION

1. Field of the Invention

The present invention relates to an apparatus for attaching and detaching an accessory, such as a lens hood, to and from a front end of a lens barrel.

2. Description of Related Art

In a known photographing lens, an accessory, such as a lens hood or the like, is detachably attached to the front end of a lens barrel to block light which is external to object light from the lens.

A known mechanism for attaching and detaching an accessory to a lens barrel is a bayonet mechanism. The bayonet enables the accessory to be attached to and detached from the lens barrel by rotating the lens barrel. During rotation of the lens barrel, friction occurs between the lens barrel and accessory producing a certain degree of torque (referred to hereinafter as an engagement or a disengagement torque). Owing to this engagement or disengagement torque, an accidental detachment of the accessory, or an accidental movement or oscillation of the accessory after the attachment thereof, are prevented. It is possible to provide a snapping engagement and disengagement mechanism for the accessory.

However, in the known arrangement as discussed above, friction inevitably exists at the sliding portion between the accessory and the lens barrel. This can cause the surface to be scratched or damaged, eventually resulting in an insecure engagement of the accessory due to the decrease in engagement torque. Further, scratches on the sliding surface are not desirable for aesthetic reasons. The decreased engagement or disengagement torque might cause the accessory to be accidentally detached from the lens barrel.

SUMMARY OF THE INVENTION

The primary object of the present invention is to provide a lens accessory attaching and detaching apparatus in which an accessory, such as a lens hood, is detachably attached to a front end of a lens barrel by means of a bayonet mechanism, wherein the attachment and detachment of the accessory can be easily carried out. It is a further object that scratches or cracks are prevented from occurring on the barrel surface, a sufficiently firm engagement and disengagement is achieved, and accidental detachment of the accessory does not occur, wherein such engagement and disengagement is clearly noticeable by the photographer.

To achieve the object mentioned above, according to the present invention, an apparatus for detachably attaching an accessory to a cylindrical front end of a lens barrel is provided. The front end of the lens barrel and the accessory are provided with engaging members which are engaged and disengaged only when a predetermined angular relationship between the lens barrel and the accessory is met. The accessory is provided with at least one roller which is rotatably supported by a shaft extending parallel to an optical axis of the lens barrel. At least one abutting surface is provided on a front end of the lens barrel which comes into contact with the roller or rollers of the accessory during relative rotation of the accessory in contact with the lens barrel.

It is preferable that the front and rear ends of the accessory are provided with mounting portions which can be detachably attached to the front end of the lens barrel with frontward and rearward orientations. It is further preferable that a radius of a circle defined by a circumferential movement of the roller or rollers in a free state is less than a radius of the abutting surface defined by the distance from the optical axis of the lens barrel to the abutting surface.

According to another aspect of the invention, the cylindrical front end of the lens barrel is provided with at least one pair of bayonet claws projecting from an outer peripheral surface of the cylinder and at least one pair of recesses formed between the bayonet claws. The accessory is provided with at least one pair of fixing claws which are engaged with the bayonet claws to restrict an axial movement of the fixing claws with respect to the bayonet claws. At least one pair of rollers, which are rotatably supported by shafts extending parallel to the optical axis, are provided. The rollers are located between the recesses at a predetermined position and come into contact with the outer peripheral surfaces of the bayonet claws during relative rotation of the accessory and the lens barrel. A radius of a circle defined by a circumferential movement of the rollers in a free state is smaller than a radius of outer peripheral surfaces of the bayonet claws. The outer peripheral surfaces of the bayonet claws comprise roller holding grooves in which the rollers can be fitted at a specific position in which said fixing claws are engaged by said bayonet claws. A stop mechanism is provided for restricting a range of relative rotation of the accessory and the lens barrel between an attachment and detachment commencing position of the accessory, and an attached position of the accessory, in which the rollers are fitted in the roller holding grooves. Flanges are provided on a front end of the lens barrel. The flanges and the bayonet claws hold the fixing claws when the bayonet claws are engaged with the fixing claws. The flanges of the lens barrel are provided with recesses corresponding to recesses of the bayonet claws, the recesses of the flanges having a circumferential length shorter than that of the recesses of the bayonet claws. The fixing claws and the rollers of the accessory are detachably attachable to the lens barrel with frontward and rearward orientations. The accessory is attached to the front end of the lens barrel in the rearward direction and the fixing claws abut against the flanges. The rollers are located within the recesses of the flanges. The flanges are provided with outer peripheral surfaces on which the rollers ride when the relative rotation of the accessory and the lens barrel occurs from the engaged state. The fixing claws are engaged between the bayonet claws and the flanges when the relative rotation of the accessory and the lens barrel takes place. Roller holding grooves are provided on outer peripheral surfaces of the flanges in which the rollers are fitted when a relative rotation of the accessory with respect to the lens barrel occurs beyond a predetermined point. A stop mechanism for limiting a range of the relative rotation of the accessory and the lens barrel between an attachment and detachment commencing position of the accessory, and an attached position, in which the rollers are fitted in the roller holding grooves. It is preferable that the rollers are made of synthetic resin so as to exhibit an elastic deformability.

The present disclosure relates to subject matter contained in Japanese Utility Model Application No. 4-88440 (filed on Dec. 24, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
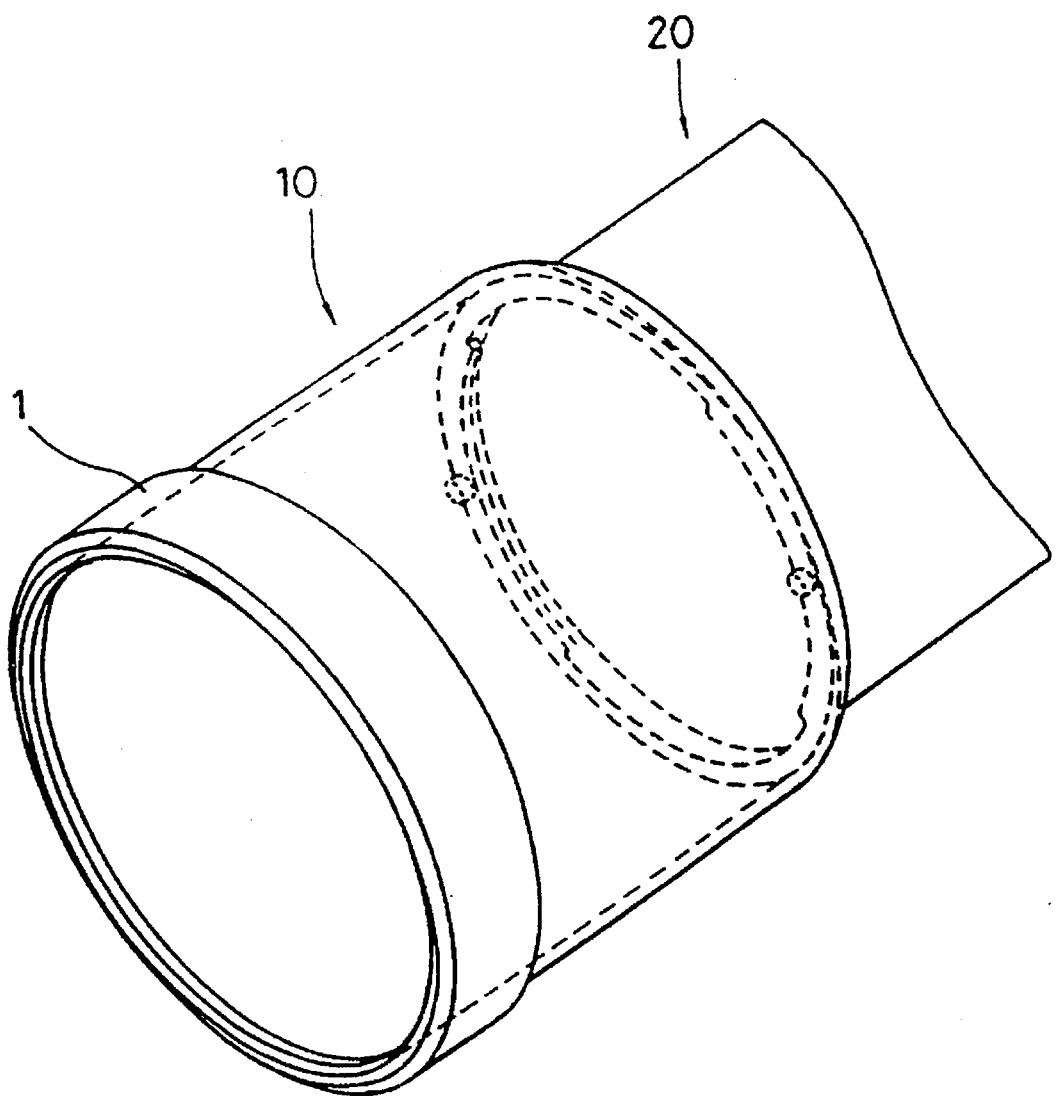
FIG. 1 is a perspective view of a lens barrel and a lens hood attached thereto, according to the present invention.
Figure 2:
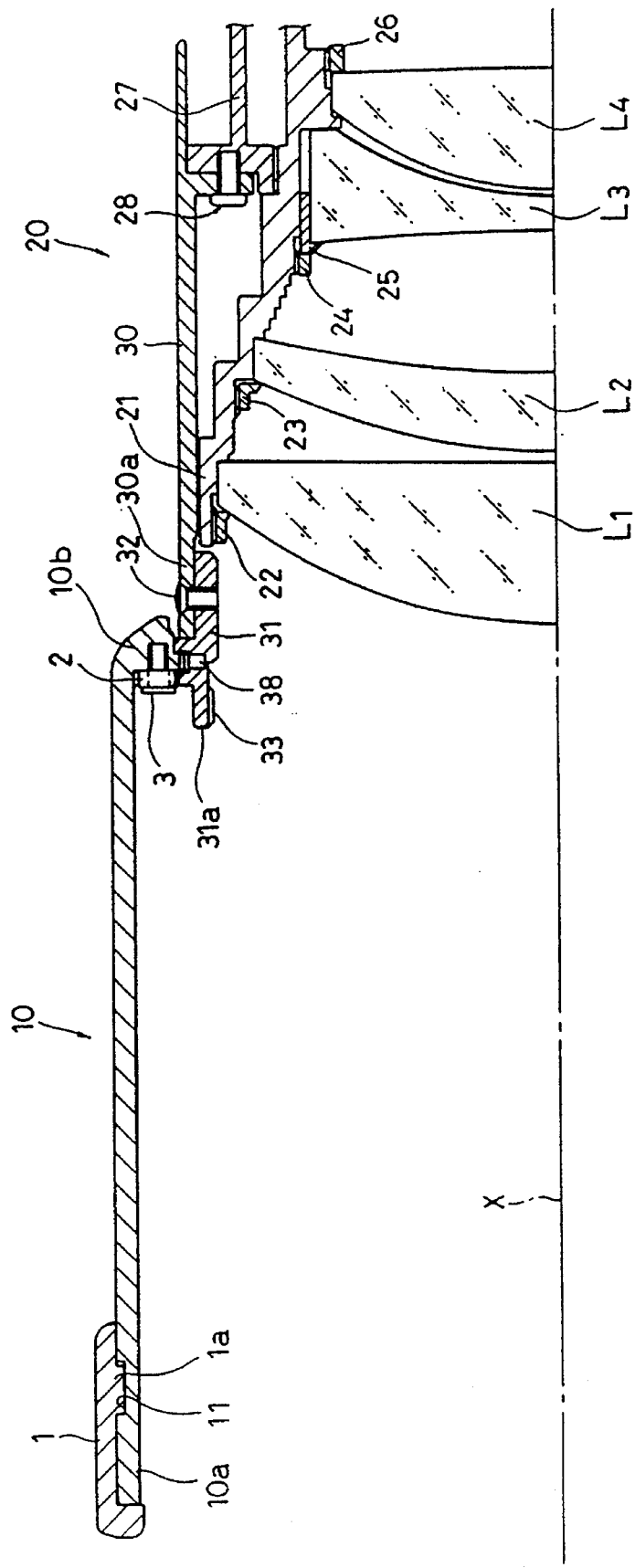
FIG. 2 is a longitudinal sectional view of an upper half of FIG. 1.

With first reference to FIGS. 1 and 2, shown is a lens barrel 20 and a lens hood 10 attached to the front end of the lens barrel 20. According to the present invention, the lens barrel 20 is, for example, an interchangeable lens barrel for a single lens reflex camera, and includes therein lenses L1, L2, L3 and L4 which are arranged in this order from the object side. The lens L1 is secured to a lens holding frame 21 by a lens keeping ring 22. Similarly, the lenses L2, L3, and L4 are secured to the lens holding frame 21 by keeping rings 23, 24, 25, and 26. The lens holding frame 21 is integrally connected to a connecting ring 27 by a threaded engagement. The connecting ring 27 is in turn secured to an outer ring 30 by machine screws 28.

A lens hood mounting ring 31 is fitted in a front end 30a of the outer ring 30 which constitutes a part of an outer cover of the lens barrel 20. The lens hood mounting ring 31 is secured to the front end 30a by machine screws 32, which are circumferentially spaced at an equiangular distance. The lens hood mounting ring 31 is provided on the inner peripheral surface of the front end 31a thereof with a female screw (i.e., threaded portion) 33 which is adapted to attach an accessory, such as a filter for example.

The lens hood 10 is preferably made of an elastically deformable material, such as synthetic resin. To the front end 10a of the lens hood 10 is attached a hood protecting ring 1 to protect and prevent the front end 10a from being deformed. The hood protecting ring 1 is provided on an inner peripheral surface thereof with an engaging portion (i.e., projection) 1a which can be fitted in an engaging groove 11 formed on an outer peripheral surface of the front end of the lens hood 10.

Moreover, the lens hood 10 is provided on the rear end thereof with a bayonet type attaching and detaching portion, which is detachably attached to the front end 31a of the lens hood mounting ring 31, so that the lens hood 10 can be detachably connected to the lens barrel 20. The attaching and detaching mechanism will be described below.

Figure 3:
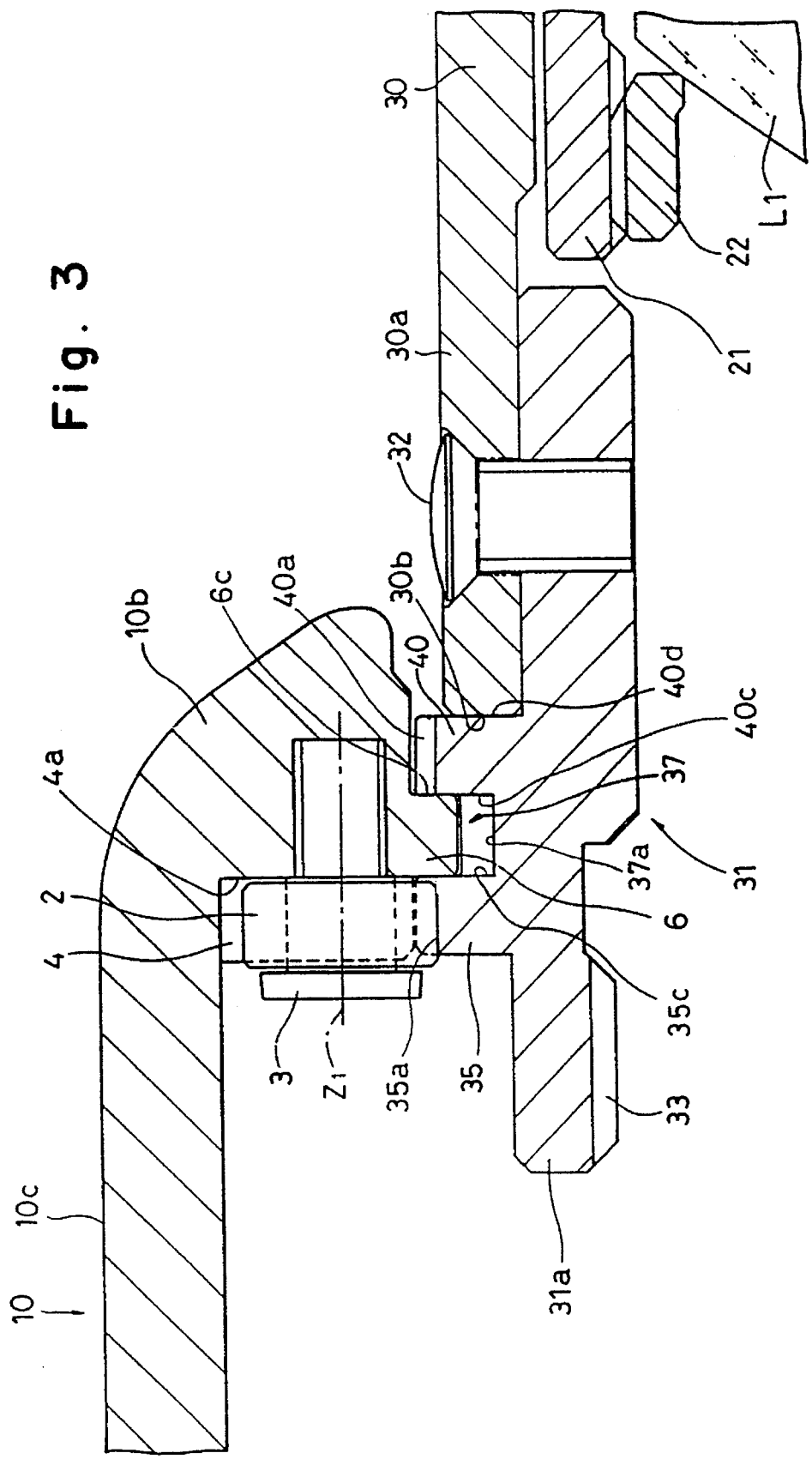
FIG. 3 is an enlarged sectional view showing the main parts of FIG. 1.
Figure 4:
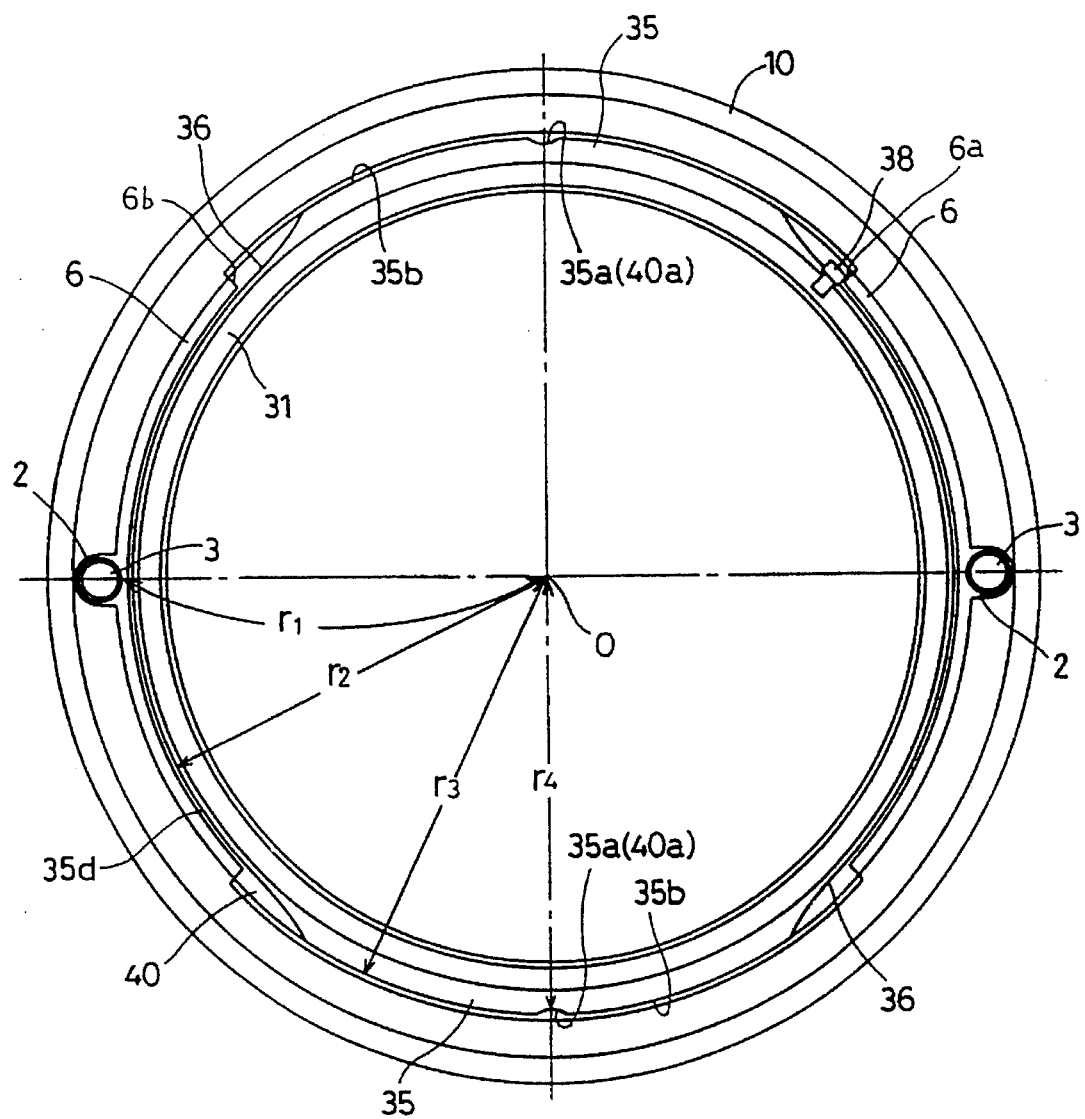
FIGS. 4, 5, and 6 are front elevational views of a lens hood shown in an attaching position, an intermediate position and an attached position, respectively.
Figure 5:
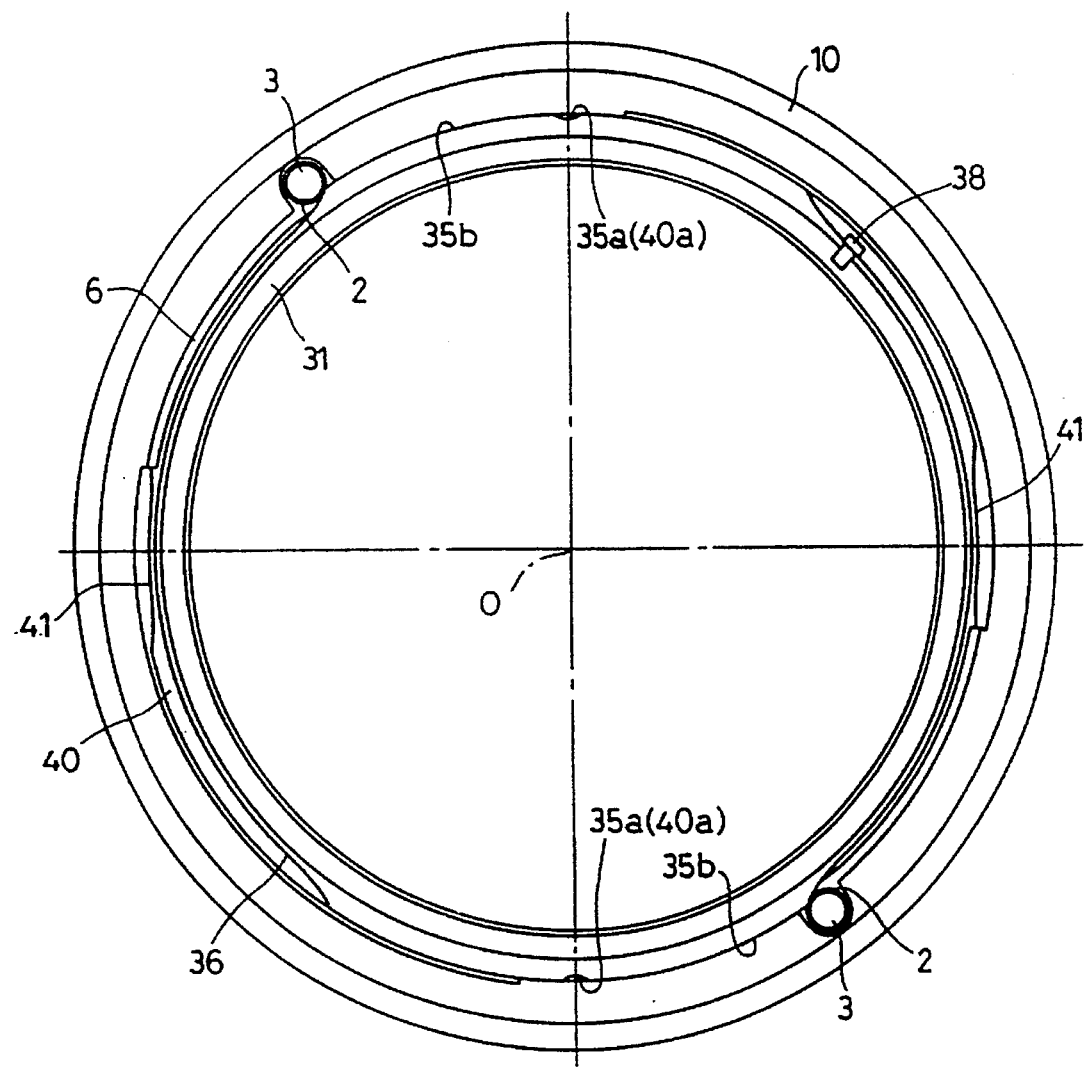
Figure 6:
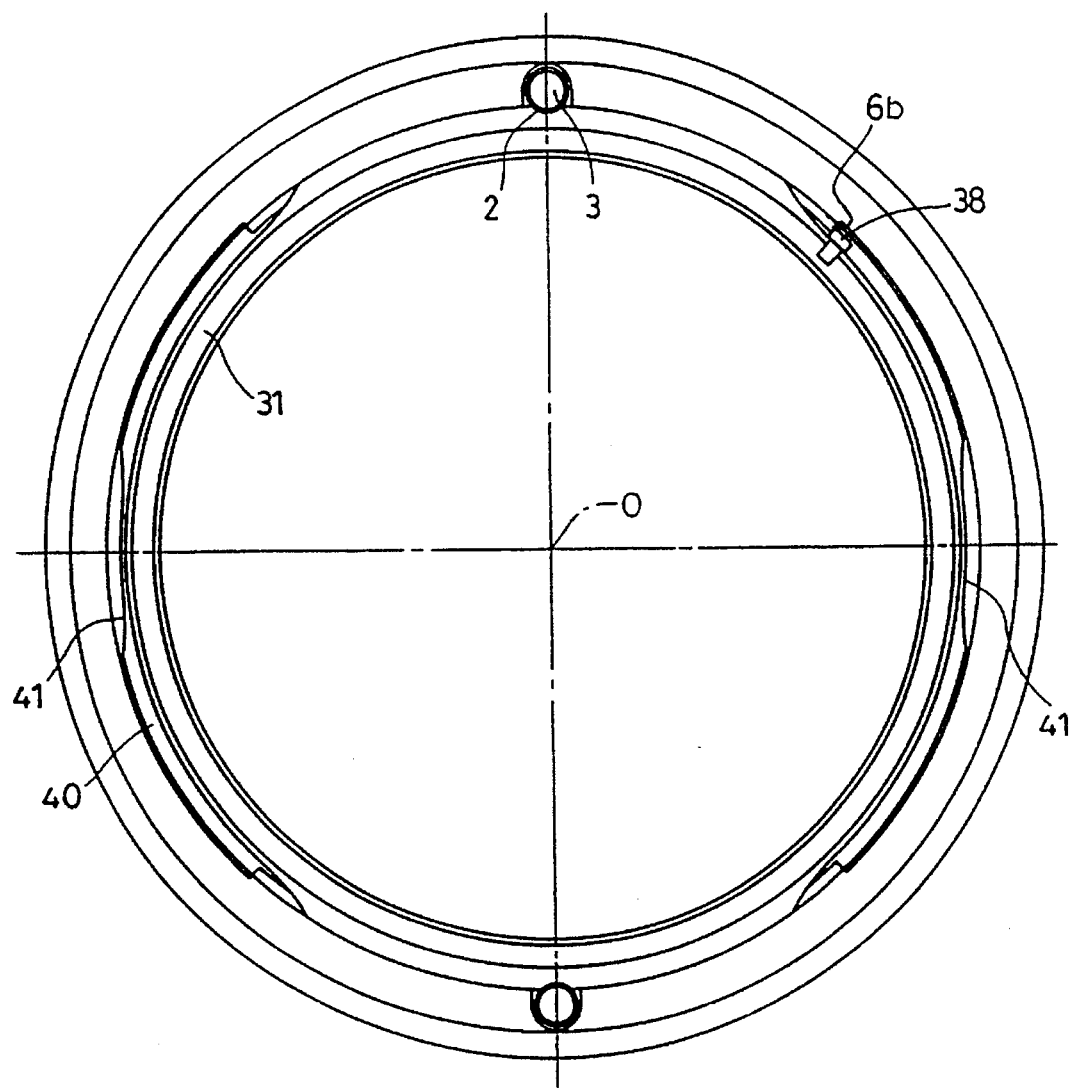

FIG. 3 is an enlarged sectional view of the engaging portion between the lens hood 10 and the lens hood mounting ring 31. FIGS. 4 through 6 show front elevational views of the lens hood 10, to illustrate stepwise the manner in which the lens hood 10 is attached to the lens hood mounting ring 31. These front elevational views are viewed from the front opening of the lens hood 10. The lens hood mounting ring 31 is provided with a pair of bayonet claws 35 which project outward from the outer peripheral surface of the front end thereof. The pair of bayonet claws 35 extend in a circumferential direction with front and rear surfaces thereof being normal to the optical axis. A pair of circumferential spaces between the bayonet claws 35 constitute a pair of attaching and detaching recesses 36 in which the lens hood 10 can be disengageably engaged.

The lens hood mounting ring 31 is provided on the outer peripheral surface thereof with a pair of flanges 40 behind the bayonet claws 35. The flanges 40 surround the lens hood mounting ring 31 and are opposed to the rear surfaces 35c of the bayonet claws 35 parallel therewith. The flanges 40 have a diameter substantially identical to the diameter of the bayonet claws 35. The flanges 40 are provided with recesses 41, whose circumferential length is shorter than that of the recesses 36, at positions corresponding to the recesses 36. The lens hood mounting ring 31 is secured in such a way that the rear end surfaces 40d of the flanges 40 abut against the front end 30a of the outer ring 30.

The space between the front surfaces 40c of the flanges 40 and the rear surfaces 35c of the bayonet claws 35 constitutes an annular supporting groove 37 which extends in the circumferential direction. The annular supporting groove 37 is adapted to slidably guide fixing claws 6 of the lens hood 10 and retain the same in the attached position. The annular supporting groove 37 is provided on the bottom surface thereof with a stop pin 38 which projects in the radial and outward direction. The stop pin 38 comes into contact with the circumferential end surface 6a of one of the fixing claws 6 and the circumferential end surface 6b of the other fixing claw 6 to restrict the rotation of the lens hood 10 between the attachment and detachment commencement position (referred to as initial position) and the attached position (i.e., attachment completion position or fixed position). Namely, the stop pin 38 forms a positioning and rotation restricting means.

The bayonet claws 35 are provided on the outer peripheral surfaces 35b thereof with roller holding grooves 35a which extend in the optical axis direction and in which rollers 2 of the lens hood 10 are fitted. Similar roller holding grooves 40a which are aligned with the roller holding grooves 35a along extensions of the latter are provided on the outer peripheral surfaces 40b of the flanges 40. When the rollers 2 are fitted in the roller holding grooves 35a, the attachment is completed.

The lens hood 10 is provided on the rear end thereof with a mount portion 10b which projects towards the optical axis O. The mount portion 10b has a pair of roller supporting recesses 4 on the inner end of the inner peripheral surface thereof. The rollers 2 are rotatably supported within the roller supporting recesses 4 by roller supporting pins 3 which extend parallel to the optical axis O. The roller supporting pins 3 are provided with threaded front ends which are screwed into roller restricting surfaces 4a formed within the roller supporting recesses 4. The rollers 2 are preferably made of synthetic resin having a small coefficient of friction, such as, for example polyacetals.

The lens hood 10 is also provided with a pair of fixing claws 6 which are formed on the inner peripheral surface of the mount portion 10b, and project towards the optical axis O in rear of the rollers 2 (adjacent to the lens barrel 20). The fixing claws 6 can be disengageably engaged in the recesses 36 from the direction of the optical axis O so as not to reach the recesses 41. Furthermore, the thickness of the fixing claws 6 in the optical axis direction is slightly smaller than the width of the annular supporting groove 37, so that the fixing claws 6 can rotate while coming into sliding contact with the opposed surfaces of the bayonet claws 35 and the flanges 40 within the annular supporting groove 37.

When the fixing claws 6 are fitted in the recesses 36, the fixing claws 6 are ready for engagement with the annular supporting groove 37. Consequently, when the lens hood 10 is rotated relative to the lens barrel 20, the fixing claws 6 are brought into engagement with the annular supporting groove 37, so that the rollers 2 rotate while in forced contact with the outer peripheral surfaces 35b of the bayonet claws 35.

The rollers 2 are positioned such that when the lens hood 10 is freely rotated about the optical axis O, the minimum radius r1 of a circular locus of the rollers 2 (i.e., a radius of a circle circumscribed by the rollers 2 whose center is located at the optical axis O) is larger than radius r2 of the bottoms of the recesses 36 having the center located on the optical axis O, and is smaller than the radius r3 of the outer peripheral surface of the bayonet claws 35 and the flanges 40 by a predetermined value.

The roller holding grooves 35a and 40a are disposed such that the rollers 2 are engaged therein to be biased towards the optical axis O. Namely, the radius r4 of a circle passing through the bottom surfaces of the roller holding grooves 35a and 40a and having a center located on the optical axis O, is smaller than the radius r3 of the outer peripheral surfaces 35b and 40b, and is larger than the radius r2 of the bottom of the annular supporting groove 37. The dimensional relationship between the radii r1, r2, r3, and r4 discussed above is as follows:

$$r2 < r1 < r3 < r4$$

Note that the bayonet mechanism including the rollers 2, fixing claws 6, bayonet claws 35, and recesses 36, etc., is in a rotation-symmetrical arrangement with respect to the optical axis O.

The following discussion will be addressed to the attaching operation of the lens hood 10. FIG. 4 shows an attached position of the lens hood 10 in which the lens hood 10 is close to the taking lens 20 with the fixing claws 6 registered with the recesses 36 so as to engage with the fixing claws 6 in the associated recesses 36. In this state, a pair of fixing claws 6 are engaged in the corresponding recesses 36, so that the rear surfaces of the fixing claws 6 abut against the side surfaces 40c of the flanges 40 and one of the circumferential end surfaces 6a of the fixing claws 6 abuts against or is close to the stop pin 38. In the attached position mentioned above, the fixing claws 6 are located within the annular supporting groove 37, but are not engaged by the bayonet claws 35.

When the lens hood 10 is rotated relative to the lens barrel 20 in the clockwise direction (i.e., attachment direction) from the position shown in FIG. 4 by a predetermined angular displacement, the fixing claws 6 enter the annular supporting groove 37 located between the bayonet claws 35 and the flanges 40 and the rollers 2 are in the position immediately before riding over the outer peripheral surfaces 35b of the bayonet claws 35, as shown in FIG. 5.

When a further rotation of the lens hood 10 relative to the lens barrel 20 from the position shown in FIG. 5 occurs, the rollers 2 ride over the outer peripheral surfaces 35b of the bayonet claws 35 past the inclined surfaces thereof and roll on the outer peripheral surfaces 35b in accordance with the rotation of the lens hood 10. As mentioned before, when the rollers 2 ride over the outer peripheral surfaces 35b, the radius r1 corresponding to the distance from the optical axis O to the rollers 2 is smaller than the radius r3 corresponding to the distance from the optical axis O to the outer peripheral surfaces 35b. Accordingly, an elastic deformation of the rollers 2 and the lens hood 10 takes place, so that the holding pressure in the direction in which the outer peripheral surfaces 35b of the bayonet claws 35 come close to each other can be produced. Due to the holding pressure, resistance to the rotation of the lens hood 10 is enhanced, resulting in a generation of a predetermined magnitude of the engagement and disengagement torque during the rotation of the lens hood 10.

When the lens hood 10 is further rotated, the attachment is completed, as shown in FIG. 6. In this state (i.e., attached position), the rollers 2 are fitted in the roller holding grooves 35a formed in the outer peripheral surfaces 35b of the bayonet claws 35. Since the radius r4 corresponding to the distance between the optical axis O and the innermost bottom surface portions of the roller holding grooves 35a is larger than the radius r1 corresponding to the distance from the optical axis O to the rollers 2, the lens hood 10 is elastically retained so as not to rotate from the attachment completion position.

Figure 7:
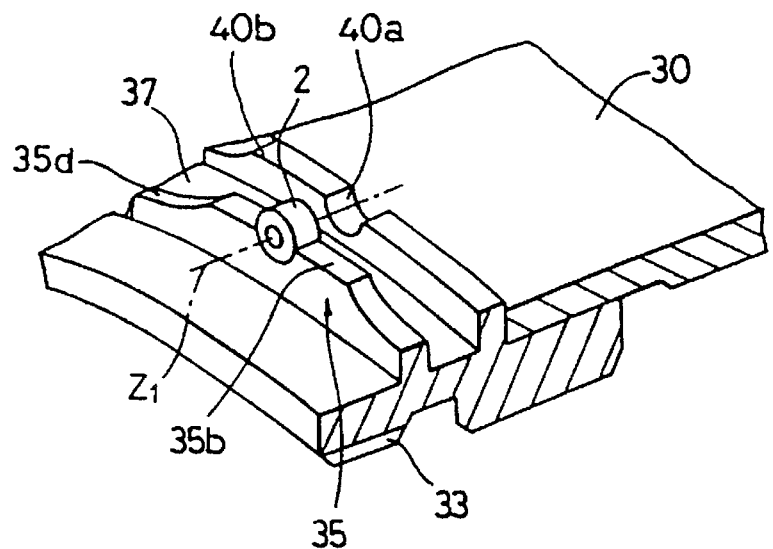
FIG. 7 is a schematic perspective view of a lens hood in an attached position.

Also, in the attachment completion position, the stop pin 38, formed in the annular supporting groove 37, abuts against or is close to the circumferential one end 6b of one of the fixing claws 6 to restrict a further rotation of the lens hood 10. This is the completion of the attachment of the lens hood. The relationship between the roller holding grooves 35a and the rollers 2 in the attached position shown in FIG. 6 is schematically illustrated in FIG. 7.

Note that upon detaching the lens hood 10, the lens hood 10 is rotated to the position in FIG. 4 in the reverse direction. In this state, the fixing claws 6 are located within the annular supporting groove 37 but have been disengaged from the bayonet claws 35.

FIG. 15 shows a graph of a variation of the engagement and disengagement torque and the rotational angle of the lens hood 10 with respect to the lens barrel 20. In FIG. 15, the angle identical to 0 (zero) corresponds to the initial position of FIG. 4 and the angle identical to 90 degrees corresponds to the attachment completion position (fixed position) shown in FIG. 6, respectively. As can be seen from the graph shown in FIG. 15, a certain degree of engagement and disengagement torque is necessary to rotate the lens hood 10 from the attachment completion position, and accordingly, no accidental detachment of the lens hood would occur.

The rollers 2 can be exchanged for other rollers by disassembling the roller supporting pins 3. Consequently, it is possible to attach rollers having a different diameter or hardness to thereby adjust the engagement and disengagement torque.

Although the above discussion has been directed to the attachment of the lens hood 10 when the latter is used, the present invention is also applicable to an embodiment in which the lens hood 10 which is not in use can be attached to the taking lens. In this state, the hood portion 10c of the lens hood 10 is detachably attached to the taking lens, as will become apparent from the discussion below.

When the lens hood is not in use, it is reversed. In other words, the hood protecting ring 1 of the lens hood faces the lens barrel 20. Consequently, the hood portion 10c can be detachably attached to the lens barrel 20 to cover the same.

Figure 8:
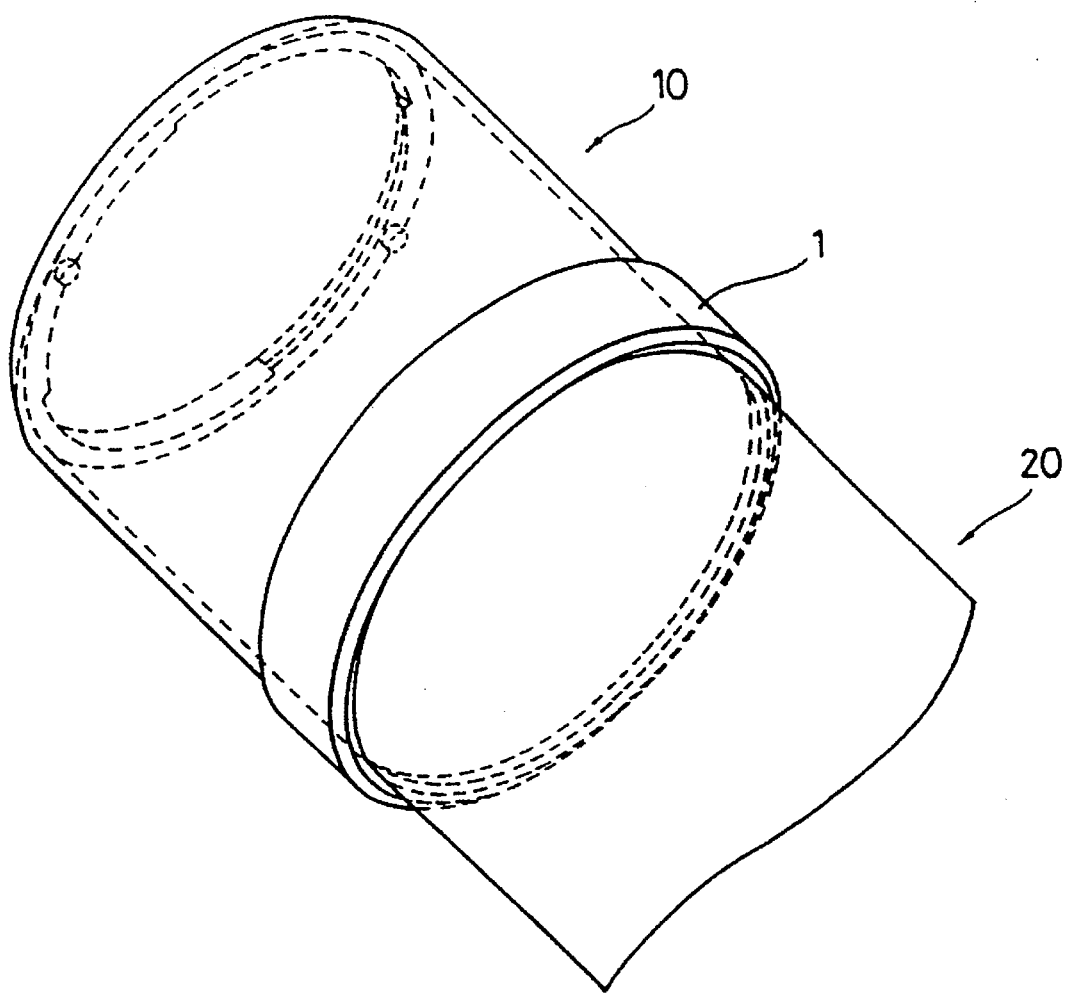
FIG. 8 is a perspective view of a lens hood which is attached to a lens barrel from an opposite direction.
Figure 9:
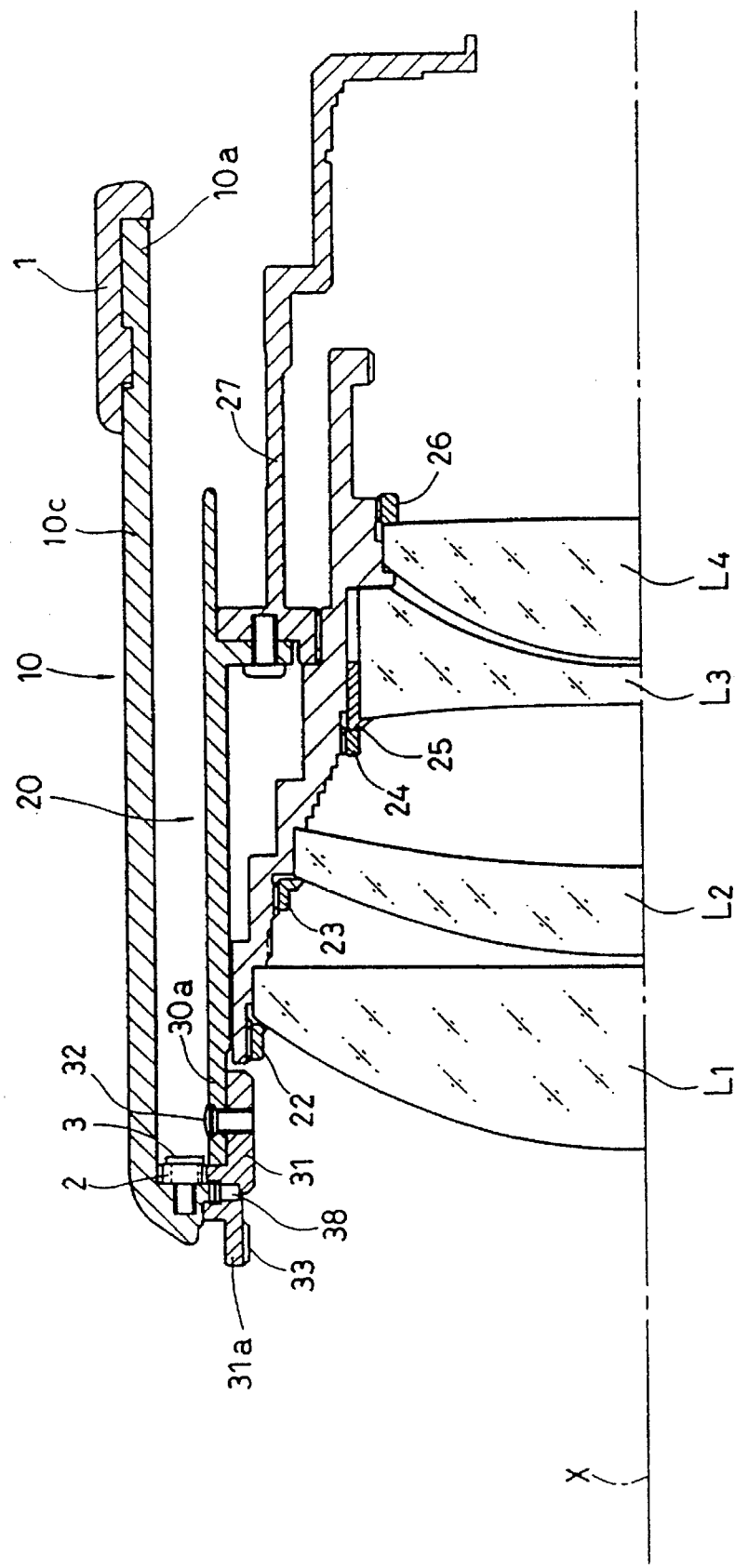
FIG. 9 is a longitudinal sectional view of an upper half of FIG. 8.
Figure 10:
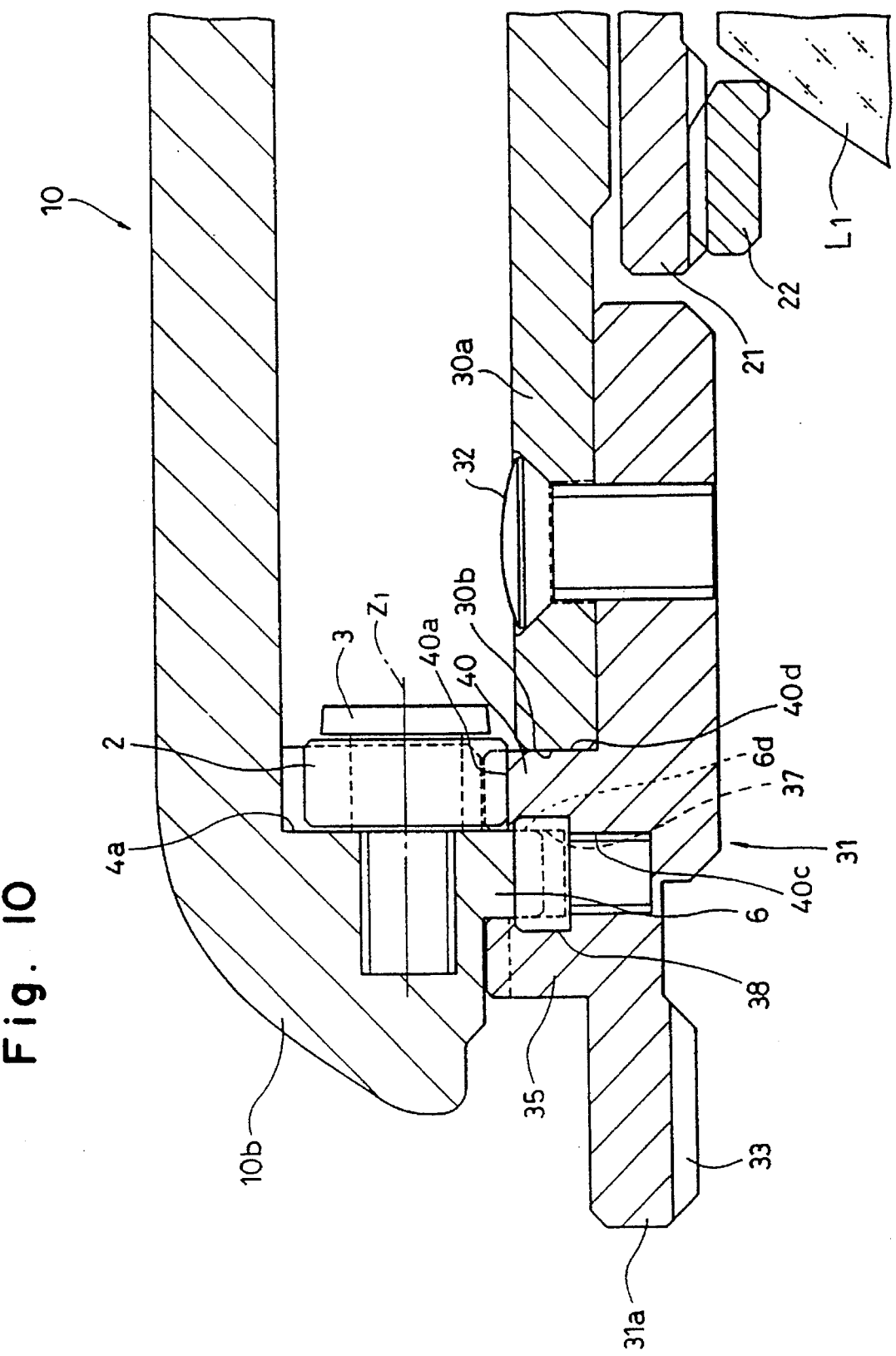
FIG. 10 is an enlarged sectional view showing main parts of FIG. 8.
Figure 11:
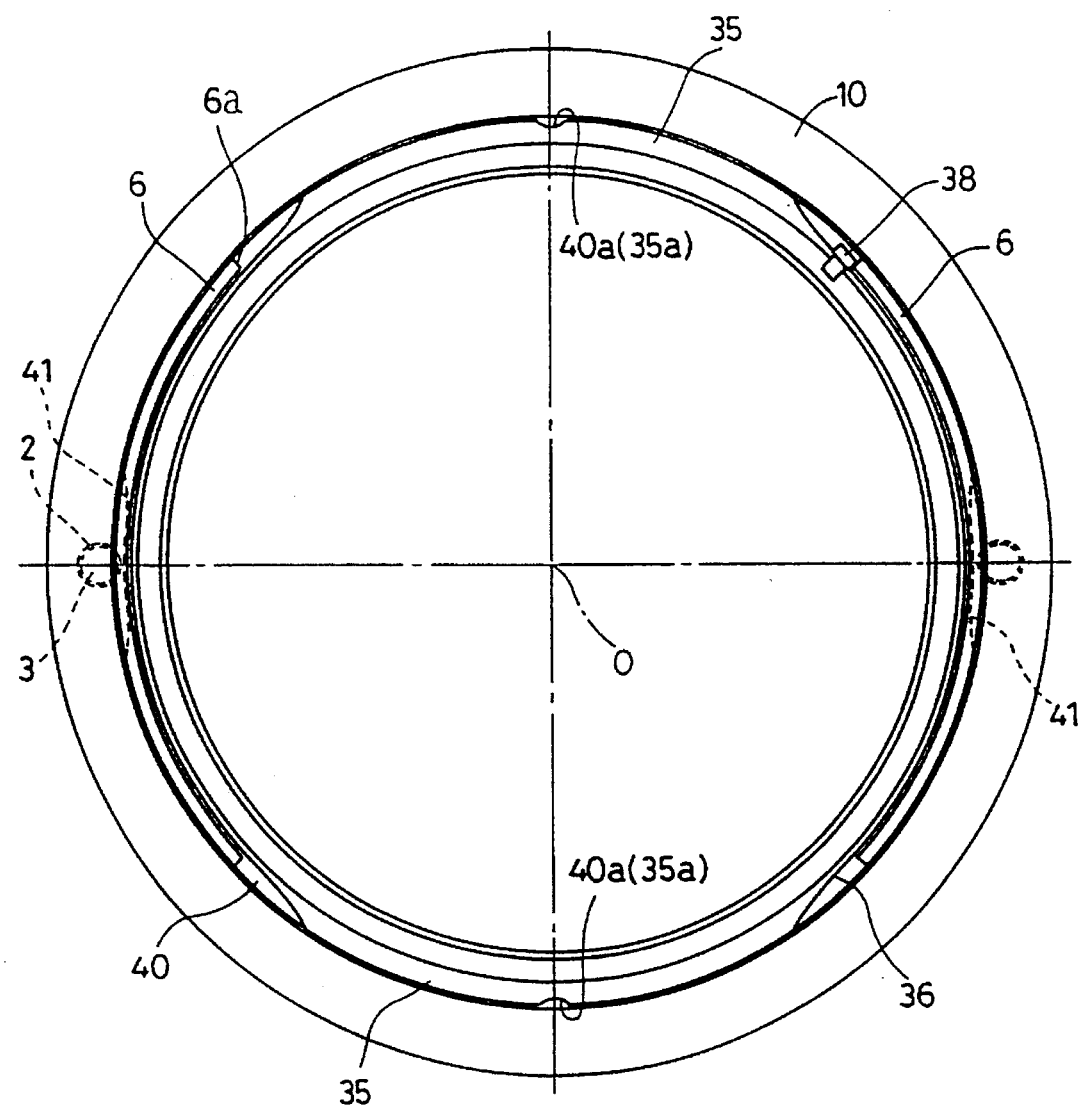
FIGS. 11, 12 and 13 are front elevational views of a lens hood which is attached to a hood mounting ring from an opposite direction, shown in an attaching position, an intermediate position of rotation, and attached position, respectively.
Figure 12:
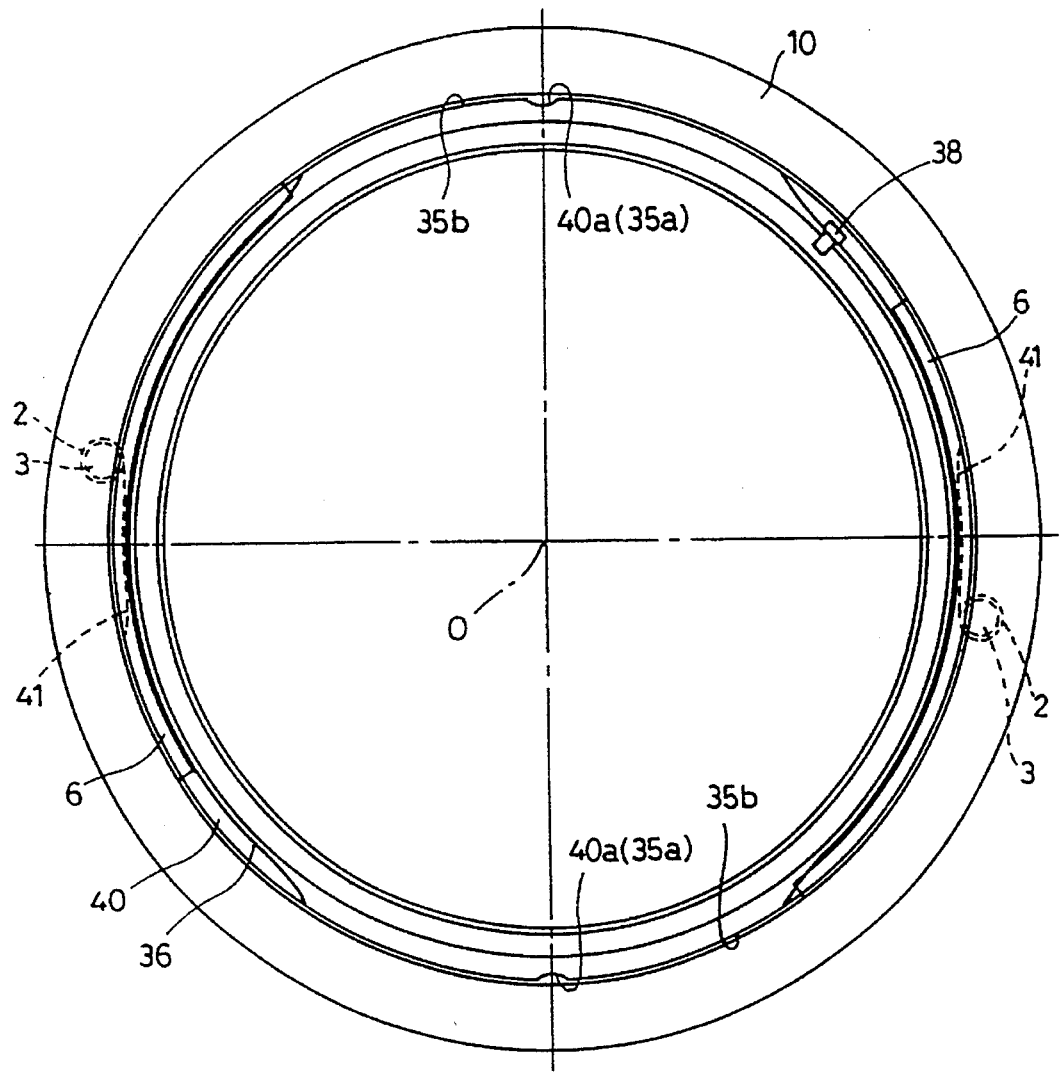
Figure 13:
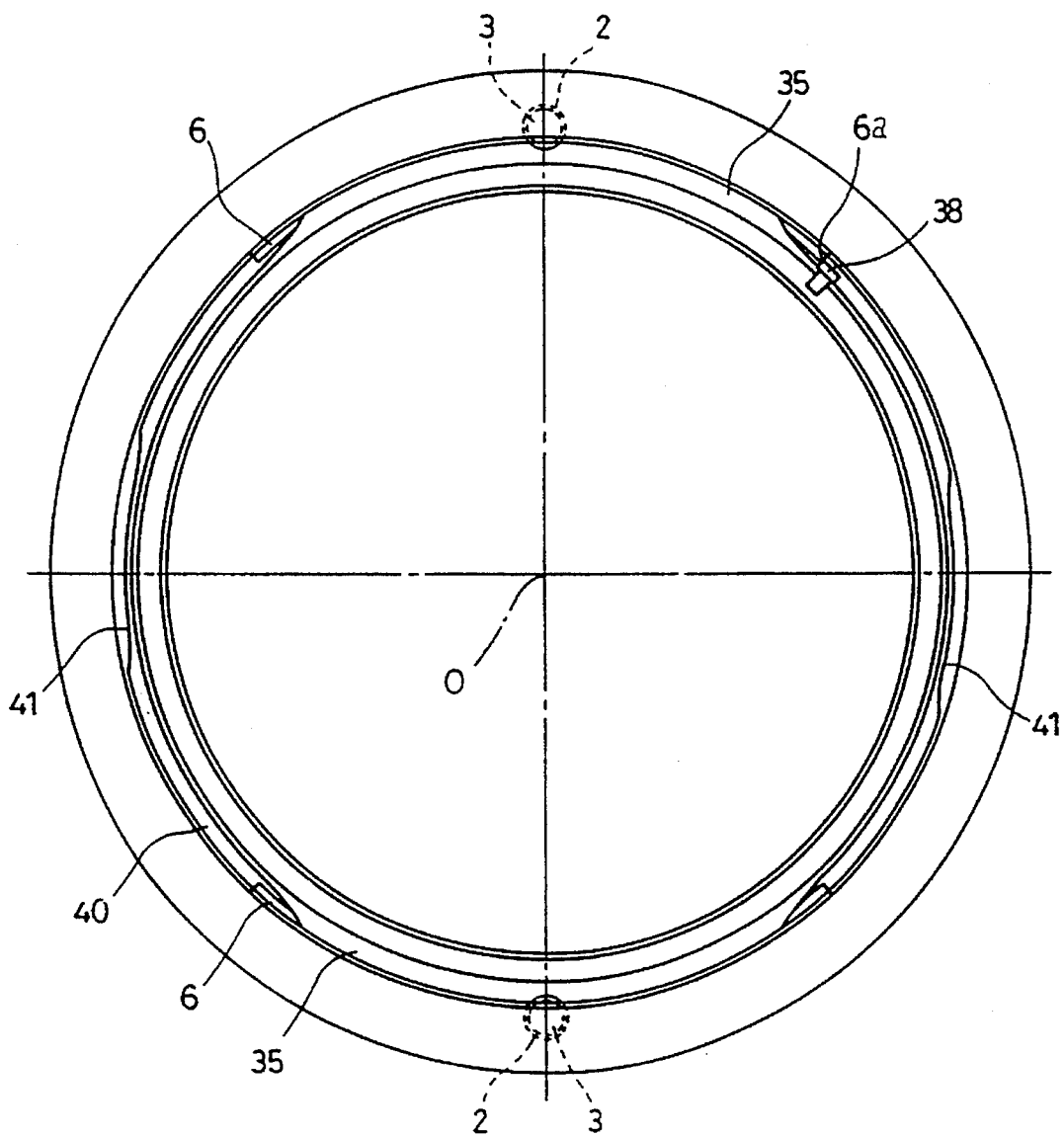

FIGS. 8 and 9 show the lens barrel 20, and the lens hood 10 which is attached thereto to cover the lens barrel, when the lens barrel is not in use. FIG. 10 shows an enlarged sectional view of the engagement of the lens hood 10 and the lens hood mounting ring 31, corresponding to FIGS. 8 and 9. FIGS. 11 through 13 show front elevational views of the lens hood 10 attached to the lens hood mounting ring 31 in successive attaching positions.

In FIG. 11, the fixing claws 6 of the lens hood 10 are registered with and inserted in the recesses 36 of the lens hood mounting ring 31. In FIG. 12 which shows an intermediate position, the lens hood 10 is rotated relative to the lens barrel 20 by a predetermined angular displacement in the clockwise direction from the position shown in FIG. 11. In FIG. 12, the fixing claws 6 are fitted in the annular supporting groove 37 between the bayonet claws 35 and the flanges 40. The rollers 2 are in the position immediately before riding over the outer peripheral surfaces 40b of the flanges 40.

A further rotation of the lens hood 10 relative to the lens barrel 20 in the clockwise direction causes rollers 2 to ride over the outer peripheral surfaces 40b of the flanges 40 and roll thereon. In this state in which the rollers 2 are on the outer peripheral surfaces 40b, the radius r1 corresponding to the distance from the optical axis O to the rollers 2 is slightly smaller than the radius r3 corresponding to the distance from the optical axis O to the outer peripheral surfaces 40b, as mentioned above. Accordingly, the rollers 2 and the lens hood 10 are elastically deformed, so that the pressure in the direction in which the outer peripheral surfaces 40b of the flanges 40 come close to each other is produced.

Figure 14:
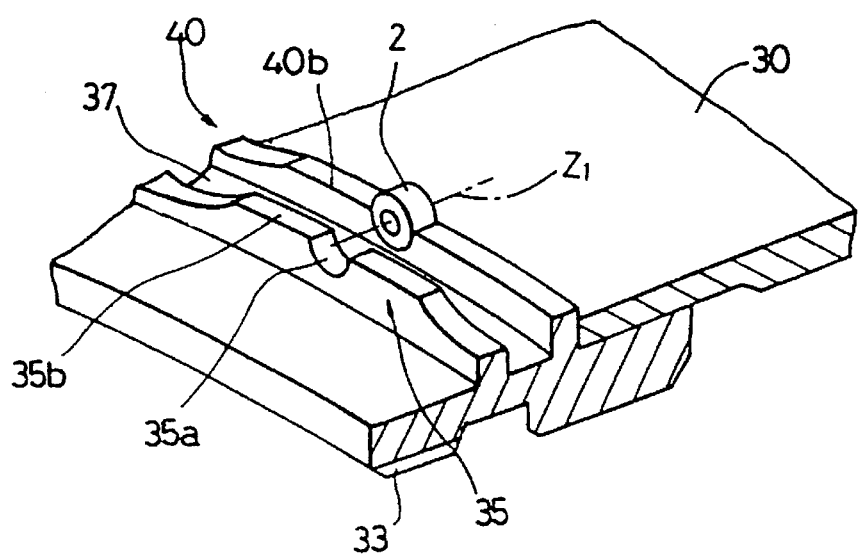
FIG. 14 is a schematic perspective view of a lens hood at an attached position; and, FIG. 15 is a diagram showing a variation in attachment and detachment torque upon attaching and detaching the lens hood to and from the lens barrel.

FIG. 13 shows the attached position which is established by further rotation of the lens hood 10 from the position shown in FIG. 12. In FIG. 13, the rollers 2 are fitted in the roller holding grooves 40a formed in the outer peripheral surfaces 40b of the flanges 40. Moreover, the circumferential end face 6a of the fixing claw 6 abuts against the stop pin 38 to restrict the further rotation of the lens hood 10. The relationship between the roller holding grooves 40a and the rollers 2 in the attachment completion position is schematically shown in FIG. 14. In FIG. 14, since a relatively large engagement and disengagement torque is necessary at the commencement of the rotation of the lens hood 10 in the direction to an initial position, accidental detachment of the lens hood does not occur.

As can be understood from the foregoing, according to the illustrated embodiments discussed above, upon attaching or detaching the lens hood 10 to or from the lens barrel 20, only the rotatable rollers 2 come into contact with the outer surface of the lens barrel 20 with a high pressure. Consequently, there is little possibility that the surface of the lens barrel 20 will be scratched, cracked or damaged during the attachment or detachment of the lens hood 10.

It goes without saying that the number of the bayonet claws, or the rollers, etc., is not limited to that of the illustrated embodiments in the present invention. Furthermore, although the bayonet claws 35 and the roller holding grooves 35a are provided on the outer peripheral surface of the lens hood mounting ring 31, it is also possible to provide the bayonet claws 35 on the inner peripheral surface of the lens hood mounting ring 31. In this alternative, the fixing claws 6 and the rollers 2, etc., are provided on the outer peripheral surface of the lens hood 10.

Although the accessory to be attached to the front end of the lens barrel is the lens hood in the illustrated embodiments, the present invention is not limited thereto. The present invention can be generally applied to a combination of a cylindrical or annular accessory and a lens barrel. In addition to the foregoing, the lens barrel is not limited to a lens barrel for a taking lens and can be any type of lens barrel, for example, for a telescope or the like.

As can be seen from the above discussion, according to the present invention, the engagement and disengagement torque can be generated by contacting the rotatable rollers with the bayonet claws. Accordingly, no cracks or scratches tend to occur or be produced on the sliding surface portion. Moreover, not only can the engagement or disengagement be felt by the photographer, but also accidental detachment of the accessory is prevented. Furthermore, owing to the simple structure of the apparatus, the number of elements can be reduced, resulting in the provision of an inexpensive accessory attaching and detaching apparatus.

Although the invention has been described with reference to particular means, materials and embodiments, it is to be understood that the invention is not limited to the particulars disclosed and extends to all equivalents within the scope of the claims.

I claim:

1. An apparatus for detachably attaching an accessory to a cylindrical front end of a lens barrel, comprising:

engaging members provided on a front end of the lens barrel and on the accessory, said engaging members engaging with and disengaging from each other only when a predetermined angular relationship between the lens barrel and the accessory is met;

at least one roller rotatably supported by a shaft extending parallel to an optical axis of the lens barrel, said shaft being provided on the accessory; and at least one abutting surface provided on the front end of the lens barrel which comes into contact with said at least one roller during relative rotation of the accessory in contact with the lens barrel.

2. The apparatus of claim 1, wherein said at least one roller and said at least one abutting surface are detachably attachable to the lens barrel with frontward and rearward orientations of the accessory.

3. The apparatus of claim 1, wherein a radius of a circle defined by a circumferential movement of said at least one roller in a free state is less than a radius of said abutting surface defined by a distance from the optical axis of the lens barrel to said abutting surface.

4. The apparatus of claim 3, wherein said at least one roller is made of synthetic resin so as to exhibit an elastic deformability.

5. The apparatus of claim 3, wherein the accessory is provided with a mounting portion which can be detachably attached to the lens barrel; said mounting portion comprising synthetic resin so as to exhibit an elastic deformability.

6. The apparatus of claim 1, wherein said at least one roller comprises synthetic resin having a small coefficient of friction.

7. The apparatus of claim 1, wherein said rollers comprise polyacetals.

8. An apparatus for detachably attaching an accessory to a cylindrical front end of a lens barrel, said lens barrel comprising:

at least one pair of bayonet claws projecting from an outer peripheral surface of the cylindrical front end of the lens barrel, said at least one pair of bayonet claws being circumferentially spaced about the lens barrel and comprising peripheral abutting surfaces adapted for contact therewith;

at least one pair of recesses formed between said bayonet claws;

at least one pair of flanges projecting from the outer peripheral surface of the cylindrical front end of the lens barrel, behind said at least one pair of bayonet claws, respectively; and at least one pair of recesses formed between said flanges.

9. The apparatus of claim 8, wherein the accessory is provided with at least one pair of fixing claws which are engaged with said bayonet claws to restrict an axial movement of said fixing claws with respect to said bayonet claws when a relative rotation takes place, and at least one pair of rollers which are rotatably supported by shafts extending parallel to an optical axis of the lens barrel.

10. The apparatus of claim 9, wherein said rollers are inserted into said recesses formed between said flanges, and come into contact with said peripheral abutting surfaces of said bayonet claws during relative rotation of the accessory and the lens barrel.

11. The apparatus of claim 10, wherein a radius of a circle defined by a circumferential movement of said at least one pair of rollers in a free state is smaller than a radius of a circle defined by said peripheral abutting surfaces of said bayonet claws.

12. The apparatus of claim 10, wherein roller holding grooves are provided on said peripheral abutting surfaces of said bayonet claws in which said rollers can be fitted at a specific position in which said fixing claws are engaged by said bayonet claws.

13. The apparatus of claim 12, further comprising stop means for restricting a range of relative rotation of the accessory and the lens barrel between an attachment commencing position of the accessory and an attached position of the accessory in which said rollers are fitted in said roller holding grooves.

14. The apparatus of claim 9, wherein said flanges and said bayonet claws hold said fixing claws when said bayonet claws are engaged with said fixing claws.

15. The apparatus of claim 14, wherein said recesses formed between said flanges correspond to recesses formed between said bayonet claws, and said recesses formed between said flanges have a circumferential length shorter than a circumferential length of said recesses formed between said bayonet claws.

16. The apparatus of claim 15, wherein said fixing claws and said rollers are detachably attachable to the lens barrel with frontward and rearward orientations of the accessory.

17. The apparatus of claim 16, wherein when said accessory is attached to the cylindrical front end of the lens barrel in a rearward direction, said fixing claws abut against said flanges and said rollers are located within said recesses of said flanges.

18. The apparatus of claim 17, wherein said flanges are provided with outer peripheral surfaces on which said rollers ride when said relative rotation of the accessory and the lens barrel occurs from a state wherein said bayonet claws are engaged with said fixing claws.

19. The apparatus of claim 18, wherein said fixing claws are engaged between said bayonet claws and said flanges when said relative rotation of the accessory and the lens barrel takes place.

20. The apparatus of claim 19, wherein roller holding grooves are provided on said outer peripheral surfaces of said flanges in which said rollers are fitted when a relative rotation of the accessory with respect to the lens barrel occurs beyond a predetermined point.

21. The apparatus of claim 20, further comprising stop means for limiting a range of said relative rotation of the accessory and the lens barrel between an attachment commencing position of the accessory and an attached position of the accessory in which said rollers are fitted in said roller holding grooves.

22. The apparatus of claim 21, wherein the accessory comprises a lens hood which is detachably attachable to the lens barrel.

23. The apparatus of claim 22, wherein said at least one pair of fixing claws and said at least one pair of rollers are provided on a rear end of said lens hood said at least one pair of fixing claws and said at least one pair of rollers being detachably attached to said lens barrel with forward and rearward orientations of said lens hood.

24. The apparatus of claim 9, wherein said at least one pair of rollers are made of synthetic resin so as to exhibit an elastic deformability.

25. The apparatus of claim 9, wherein the accessory comprises a mounting portion which can be detachably attached to said lens barrel and which is made of synthetic resin so as to exhibit an elastic deformability.

26. The apparatus of claim 9, wherein said rollers comprise synthetic resin having a small coefficient of friction.

27. The apparatus of claim 9, wherein said rollers comprise polyacetals.

* * * * *

UNITED STATES PATENT AND TRADEMARK OFFICE
CERTIFICATE OF CORRECTION

PATENT NO. : 5,461,445
DATED : October 24, 1995
INVENTOR(S) : K. KIKUCHI

It is certified that error appears in the above-indentified patent and that said Letters Patent is hereby corrected as shown below:

At column 9, line 47 (claim 15, line 2), before "recesses" insert ---said---.

Signed and Sealed this

Thirty-first Day of December, 1996

*Attest:*

BRUCE LEHMAN

*Attesting Officer*  *Commissioner of Patents and Trademarks*